(12) United States Patent
Shimizu et al.

(10) Patent No.: US 9,314,890 B2
(45) Date of Patent: Apr. 19, 2016

(54) COMPOSITE PROCESSING MACHINE

(71) Applicant: O-M LTD., Osaka-shi, Osaka (JP)

(72) Inventors: Tatsuo Shimizu, Nagaoka (JP); Takio Nakamura, Nagaoka (JP); Katsunori Kabasawa, Nagaoka (JP); Akihiro Goto, Nagaoka (JP)

(73) Assignee: O-M LTD., Osaka (JP)

( * ) Notice: Subject to any disclaimer, the term of this patent is extended or adjusted under 35 U.S.C. 154(b) by 384 days.

(21) Appl. No.: 13/945,372

(22) Filed: Jul. 18, 2013

(65) Prior Publication Data

US 2014/0033490 A1    Feb. 6, 2014

(30) Foreign Application Priority Data

Jul. 31, 2012    (JP) .................................. 2012-170046

(51) Int. Cl.
| | |
|---|---|
| *B23Q 5/10* | (2006.01) |
| *B23Q 16/10* | (2006.01) |
| *B23B 29/32* | (2006.01) |

(52) U.S. Cl.
CPC .............. *B23Q 16/10* (2013.01); *B23B 29/323* (2013.01); *B23Q 5/10* (2013.01); *B23Q 2220/002* (2013.01); *Y10T 29/5155* (2015.01); *Y10T 74/1494* (2015.01)

(58) Field of Classification Search
CPC ............ Y10T 29/5154; Y10T 29/5155; Y10T 408/37
USPC .......................................... 29/39–40; 408/35
See application file for complete search history.

(56) References Cited

U.S. PATENT DOCUMENTS

| | | | | |
|---|---|---|---|---|
| 4,847,960 A * | 7/1989 | Hafla | ...................... | B23B 3/162 29/40 |
| 5,178,040 A * | 1/1993 | Schmidt | ................... | B23Q 5/00 74/813 L |
| 5,842,392 A * | 12/1998 | Pfeifer | .................... | B23B 3/168 408/35 |
| 6,704,983 B2 * | 3/2004 | Matsumoto | ............ | B23Q 5/045 29/40 |
| 6,785,943 B2 * | 9/2004 | Sheehan | ............... | B23Q 16/102 29/40 |
| 7,761,965 B2 * | 7/2010 | Nakamura | ........... | B23Q 16/102 29/35.5 |
| 8,640,571 B2 * | 2/2014 | Shimizu | ............... | B23Q 1/5431 29/35.5 |

FOREIGN PATENT DOCUMENTS

| | | | |
|---|---|---|---|
| EP | 214090 A1 * | 3/1987 | |
| GB | 2126134 A * | 3/1984 | |
| JP | 57-149903 A | 9/1982 | |
| JP | 05-096403 A | 4/1993 | |
| JP | 06-182606 A | 7/1994 | |
| JP | 11-254211 A | 9/1999 | |
| JP | 4383475 B2 | 12/2009 | |

* cited by examiner

*Primary Examiner* — Erica E Cadugan
(74) *Attorney, Agent, or Firm* — Sughrue Mion, PLLC

(57) ABSTRACT

A composite processing machine with an automatic swiveling composite turret device. Transmitting and releasing of rotational force to a rotating tool is automatically switched between indexing and locked securing. Included is a clutch-action-coupled rotational force transmission/release switching mechanism (10). A common motor (9) is the drive source for a rotation drive mechanism (7) for transmitting rotational force to a rotating tool (5) and a swivel drive mechanism (8) for swiveling a turret (3). Transmission of rotational force of common motor (9) to rotation drive mechanism (7) is released when turret (3) is slid along swivel shaft part (2) to unlock clutch device (4) and enable turret (3) to swivel, and rotational force of common motor (9) is transmitted to rotating tool (5) when turret (3) is slid back to lock and secure clutch device (4) in an indexed position of turret (3).

8 Claims, 8 Drawing Sheets

COMPOSITE PROCESSING MACHINE

CROSS REFERENCE TO RELATED APPLICATIONS

This application claims priority based on Japanese Patent Application No. 2012-170046 filed Jul. 31, 2012, the contents of all of which are incorporated herein by reference in their entirety.

BACKGROUND OF THE INVENTION

1. Field of the Invention

The present invention relates to a composite processing machine having composite functions such as boring, which is also a machine tool comprising an automatic swiveling turret such as a large vertical lathe, for example.

2. Description of the Related Art

An automatic swiveling turret device, wherein a plurality of tools (tool holders) that are switched and used by swiveling are provided to a turret, and the turret is automatically swiveled relative to a turret head when the tool is switched or when the tool angle is changed, commonly has a configuration such as the following (referring to the drawings of the present example, the description appends the same symbols to the same components of the present example).

The configuration is designed so that a turret 3 provided with a plurality of tools (a plurality of cutting tools 26 replaceably provided to a plurality of respective holders 25) is swivelably fitted onto a swivel shaft part 2 secured in a protruding manner to a turret head 1, the turret also being capable of sliding back and forth along the swivel shaft part 2; a clutch device 4 is provided for disengageably locking and securing a turret indexed position by the axial sliding of the turret 3, the sliding of the turret 3 from a proximal end to a distal end causes the locked securing of the clutch device 4 to be released (unclamped), enabling the turret 3 to swivel, and the turret 3 is slid back to the indexed position after swiveling to be locked and secured (clamped) by the clutch device 4 so as to be incapable of swiveling.

Specifically, the configuration is designed so that there is provided a transmission gear 11 (an internal gear 11 that swivels about the swivel shaft part 2 as an axis) which meshes with a small transmission gear 28 driven by a swivel drive source (a servo motor) for indexing the turret 3, clutch locking parts 29 are provided to the turret head 1 as the clutch device 4, clutch engagement parts 30 for engaging with the clutch locking parts 29 in a rotation-stopping manner by concave and convex parts are provided to the proximal end of the turret 3, the engagement between the clutch locking parts 29 and the clutch engagement parts 30 is released to enable the turret 3 to swivel when the turret 3 slides from the proximal end to the distal end, the turret 3 is swiveled by an indexing swivel drive source via components such as the small transmission gear 28 and the transmission gear 11, and the turret 3 is indexed.

Also provided is a turret slide mechanism 15 for releasing the clutch engagement (for switching between clamping and unclamping), which is composed of a clutch-releasing pressure chamber 31 for channeling air from a slide-driving air supply device via a solenoid valve and thereby causing the turret 3 to slide axially to unlock the clutch device 4, and a sliding movement gap 32 enclosed by the clutch-releasing sliding of the turret 3, the sliding movement gap also being a clutch pressure chamber 32 to which air is conversely channeled by the switching of the solenoid valve, whereby the turret 3 is slid back and locked and secured by the clutch device 4.

There follows a description in further detail. An overhanging part 16 is provided to the swivel shaft part 2, the turret 3 is configured so that in both the proximal end side and the distal end side of the overhanging part 16, gaps are formed which are widened and narrowed by the sliding of the turret 3 and which are sealed by a mutual O ring or the like to achieve complete separation, one gap formed by the turret 3 and the distal end surface of the overhanging part 16 constitutes the clutch-releasing pressure chamber 31, another gap formed by the turret 3 and the proximal end side of the overhanging part 16 constitutes the clutch pressure chamber 32 which is the sliding movement gap 32, air is channeled to the clutch-releasing pressure chamber 31 by the air supply device via an air supply channel 33 provided to the swivel shaft part 2 or the overhanging part 16, thereby pushing the clutch-releasing pressure chamber 31 open and causing the turret 3 to slide to the distal end relative to the overhanging part 16 on the secured side to unlock the clutch device 4, and air is conversely channeled to the clutch pressure chamber 32, thereby pushing the clutch pressure chamber 32 open and causing the turret 3 to slide back to the proximal end relative to the overhanging part 16 on the secured side to lock and secure the indexed position of the turret 3 through the clutch device 4.

In such a machine tool, a large clamping force is needed because in addition to the weight of the turret 3 equipped with a plurality of tools among which swiveling can be switched, a large load acts during processing and particularly during lathe turning. Therefore, a mainstream configuration has been one in which a hydraulic sliding mechanism is used rather than the air pressure as previously described in the driving of the sliding of the turret 3 in the automatic swiveling turret device, and after the turret has finished swiveling, the locked and secured state of the clutch is held under pressure by the hydraulic sliding mechanism which produces a large clamping force. However, with a configuration in which the turret 3 is slid to release the clutch device 4 by oil pressure produced by this large clamping force, a slide-driving force greater than necessary is produced when the turret 3 is slid in order to swivel (in order to release the clutch).

In other words, when the sliding movement gap 32 is narrowed and eliminated by the sliding for releasing the clutch, yielding a state of contact, a large sliding friction resistance is produced in the contacting surfaces during swiveling of the turret, because of the pushing by the oil pressure.

Specifically, when the turret 3 is slid back by oil pressure and the locked and secured state of the clutch device 4 is held under pressure, the large load during processing can be withstood, but there is also a risk that when the turret 3 is swiveled after the turret 3 is slid in order to release the clutch, a large slide pressing force due to the oil pressure will produce a large sliding friction resistance when the turret swivels, thereby causing wear to be more severe, durability to deteriorate, and galling to occur during swiveling.

In order to resolve such problems, there has been a need to provide a hydraulic pressure reducing mechanism or the like, wherein a bypass channel is interconnected with the previously isolated clutch-releasing pressure chamber 31, oil is fed from the clutch-releasing pressure chamber 31 into the opposite sliding movement gap 32 (the clutch pressure chamber 32) via the bypass channel, and the slide driving is reduced, when the channeling of the oil into the clutch-releasing pressure chamber 31 exceeds a predetermined pressure or when the turret slides in excess of a predetermined stroke, as shown in Unexamined Utility Model Application 57-149903, for example.

This complicates the structure and control, and presents problems in that, for example, the device becomes more expensive and less adapted to mass-production, or that, for example, the unclamping speed for releasing the clutch (swiveling the turret) has become slower. Therefore, to eliminate the use of oil pressure and limit resource consumption, the applicant has developed a turret device (Japanese Patent Publication No. 4383475) designed so that the turret 3 is slid by an air-pressure sliding mechanism that uses the air supply device as previously described, and this clutched state of the turret which has slid and is incapable of swiveling can be kept locked and secured by a wedge mechanism 24 for causing a wedge part 22 to engage with a wedge engagement part 21.

Specifically, the applicant has developed a highly innovative composite processing machine, wherein even though the pneumatic turret slide mechanism 15 may not produce drive force sufficient to directly withstand a large cutting force (lathe turning force), the weight of the turret 3 or a large cutting force can be sufficiently borne by the wedge mechanism 24, whereby the use of oil pressure can be eliminated, energy can be conserved, and resource consumption can be limited without impeding turret swiveling or the cutting function, there is no need for an oil pressure reducing mechanism that would require a complicated design or controls as previously described due to elimination the use of oil pressure, the swivel function can be easily ensured, the speed of unclamping for the purpose of swiveling is improved, etc.

SUMMARY OF THE INVENTION

An object of the present invention is to provide an innovative composite processing machine comprising an automatic swiveling composite turret device which can be designed inexpensively and compactly, wherein improvements are further advanced, composite functions such as boring and tapping are added to a turret device such as the one previously described, costs are reduced and compactness is achieved by using a common motor for both a rotation drive source for rotating a tool rotating shaft for rotating a rotating tool provided to the turret and a swivel drive source for indexing the turret, the transmitting and releasing of rotational force of the common motor to the turret is automatically switched in conjunction with the clutch lock-securing and releasing actions of the turret which is configured to switch between locked securing and releasing the clutch device by the previously-described sliding of the turret, transmission of this rotational force of the common motor to the turret is released, whereby the tool rotating shaft is transmission-rotated by the common motor and the rotating tool is caused to rotate during the action of locking and securing the clutch, and the rotational force of the common motor is transmitted to the turret, swiveling and indexing the turret by the common motor during the action of releasing the clutch, and this clutch device configuration of switching between locked securing and releasing is utilized to automatically switch between transmitting and releasing the rotational force of the common motor to the turret by switching between indexing and lock-securing the turret and switching between swiveling of the turret and rotation of the rotating tool.

A summary of the present invention is described with reference to the accompanying drawings.

The present invention relates to a composite processing machine configured so that a swivel shaft part 2 is provided to a turret head 1, a turret 3 is provided to the swivel shaft part 2 so as to be capable of swiveling and axially sliding, a clutch device 4 for locking and securing an indexed position of the turret in a manner allowing disengaging by the axial sliding of the turret 3 is provided, at least one tool attachment part 6 provided to the turret 3 is a rotating tool attachment part 6A whereby rotational force is transmitted to a mounted rotating tool 5, and the tool can be switched or the tool angle can be changed by indexing of the turret 3; the composite processing machine also being provided with a clutch-action-coupled rotational force transmission/release switching mechanism 10, in which a shared common motor 9 is used for both a rotation drive source of a rotation drive mechanism 7 for transmitting rotational force to the rotating tool 5 mounted to the rotating tool attachment part 6A, and a swivel drive source of a swivel drive mechanism 8 for swiveling the turret 3, an indexing control mechanism for performing turning amount control based on position detection is provided, the turret 3 is indexed by the indexing control mechanism and the swivel drive mechanism 8 having the common motor 9 as a drive source, the rotating tool 5 mounted to the rotating tool attachment part 6A is caused to rotate by the rotation drive mechanism 7 having the common motor 9 as a drive source, the rotational force from the common motor 9 when the turret 3 is slid along the swivel shaft part 2 to unlock the clutch device 4 and enable the turret 3 to swivel is transmitted to the turret 3, and the turret 3 swivels, and transmission of rotational force of the common motor 9 to the turret 3 is conversely released, whereby the rotational force of the common motor 9 is transmitted by the rotation drive mechanism 7, to cause the rotating tool 5 to rotate when the turret 3 is slid back in the indexed position of the turret 3 to lock and secure the clutch device 4.

The present invention also relates to a composite processing machine according to a first aspect, wherein the rotational force transmission/release switching mechanism 10 is configured so that the turret 3 is swivelably provided to the swivel shaft part 2, a transmission gear 11 caused to rotate by the common motor 9 is rotatably provided, the rotation drive mechanism 7 is configured so as to cause the tool rotating shaft 12 of the rotating tool attachment part 6A to rotate by the transmission gear 11 that rotates relative to the turret 3 about the swivel shaft part 2 as an axis and cause the rotating tool 5 mounted to the rotating tool attachment part 6A to rotate, a connect-release switching device 14 whereby the transmission gear 11 and the turret 3 are connected and caused to integrally rotate is provided in a connectable and releasable manner, and when the turret 3 slides along the swivel shaft part 2 to unlock the clutch device 4 and enable the turret 3 to swivel, the connect-release switching device 14 undergoes a connecting action in conjunction with the clutch releasing action due to sliding of the turret 3, the transmission gear 11 and the turret 3 connect and swivel integrally, the turret 3 is indexed by the transmission gear 11, and the tool rotating shaft 12 of the rotating tool attachment part 6A provided to the swiveling turret 3 does not rotate, and when the turret 3 is slid back and the turret 3 locked and secured by the clutch device 4, the connect-release switching device 14 undergoes a connection release action in conjunction with the clutch action due to sliding of the turret 3, releasing the connection of the transmission gear 11 and the turret 3, and in a state in which the turret 3 is locked and secured by the clutch device 4, the transmission gear 11 rotates, whereby the tool rotating shaft 12 of the rotating tool attachment part 6A is rotated by transmission and the rotating tool 5 mounted to this rotating tool attachment part 6A rotates.

The present invention also relates to a composite processing machine according to a second aspect, wherein the rotational force transmission/release switching mechanism 10 is configured so that the transmission gear 11 is rotatably provided together with the turret 3 to the swivel shaft part 2, a turret slide mechanism 15 for sliding the turret 3 and the transmission gear 11 back and forth along the swivel shaft part 2 is provided, the connect-release switching device 14 undergoes a connection-releasing action in conjunction with the clutch-locking action when the turret 3 is slid back in the indexed position of the turret 3 to lock and secure the clutch device 4, the transmission gear 11 is enabled to rotate relative to the turret 3 on the inner side of the turret 3 and is caused to rotate by transmission by the common motor 9, a transmission rotating shaft 13 provided to the turret 3 is turned by transmission by the transmission gear 11, and the tool rotating shaft 12 of the rotating tool attachment part 6A provided to the turret 3 is transmission-rotated by the transmission rotating shaft 13, rotating the rotating tool 5 mounted to the rotating tool attachment part 6A, and when the turret 3 slides along the swivel shaft part 2 to unlock the clutch device 4 and enable the turret 3 to swivel, the connect-release switching device 14 undergoes a connecting action in conjunction with the clutch releasing action produced by sliding of the turret 3, the transmission gear 11 and the turret 3 connect to swivel integrally and to be transmission-rotated by the common motor 9, the turret 3 is indexed by the transmission gear 11, and the transmission rotating shaft 13 and the tool rotating shaft 12 of the rotating tool attachment part 6A provided to the turret 3, which swivels integrally with the transmission gear 11, do not rotate, the connect-release switching device 14 undergoes a connection release action in conjunction with the clutch action due to sliding of the turret 3, releasing the connection of the transmission gear 11 and the turret 3, and in a state in which the turret 3 is locked and secured by the clutch device 4, the transmission gear 11 rotates, whereby the transmission rotating shaft 13 is transmission-rotated, the tool rotating shaft 12 of the rotating tool attachment part 6A is transmission-rotated by this transmission rotating shaft 13, and the rotating tool 5 mounted to this rotating tool attachment part 6A rotates.

The present invention also relates to a composite processing machine according to a third aspect, wherein the connect-release switching device 14 is configured so that a connecting pin 18 provided so as to be capable of moving in a circle to an annular attachment part 17 provided to an overhanging part 16 of the swivel shaft part 2 is passed through a through-hole 19 provided in the turret 3, the connecting pin 18 passed through the through-hole 19 is provided to a locking hole 20 of the transmission gear 11 provided on the inner side of the turret 3, the connecting pin 18 being capable of being disengaged by the integral sliding of the turret 3 and the transmission gear 11 along the swivel shaft part 2, and when locking and securing of the clutch device 4 is released by the sliding of the turret 3, so that the turret 3 can swivel, the connecting pin 18 is inserted into the locking hole 20 of the transmission gear 11, and the turret 3 and the transmission gear 11 connect and swivel integrally relative to the swivel shaft part 2, producing a connecting action in conjunction with the clutch release action produced by sliding of the turret 3.

The present invention also relates to a composite processing machine according to any of the first through fourth aspects, comprising a wedge mechanism 24 provided with a wedge engagement part 21 which moves or widens due to the back-sliding of the turret 3 when the turret 3 slides back and the clutch device 4 is locked and secured, and a wedge part 22 which engages with the wedge engagement part 21, the wedge mechanism 24 configured so that the wedge part 22 is moved to engage with the wedge engagement part 21 by being driven or urged by a wedge drive device 23, thereby keeping the turret 3 wedged and locked in a processing position where the turret has slid back to be locked and secured by the clutch device 4 and made incapable of swiveling.

Because the present invention is configured as described above, there is provided an innovative composite processing machine which comprises an automatic swiveling composite turret device that can be designed inexpensively and compactly, costs are reduced and compactness is achieved by using a common motor for both a rotation drive source for rotating a tool transmission rotating shaft and for rotating a rotating tool provided to the turret and a swivel drive source for indexing the turret, the transmitting and releasing of rotational force of the common motor to the turret is automatically switched in conjunction with the clutch lock-securing and releasing actions of the turret which is configured to switch between locked securing and releasing the clutch device by the previously-described sliding of the turret, transmission of this rotational force of common motor to the turret is released and the tool rotating shaft is caused to rotate by transmission by the common motor, rotating the rotating tool during the action of locking and securing the clutch, the rotational force of the common motor is transmitted to the turret and the turret is swiveled and indexed by the common motor during the action of releasing the clutch, and this clutch device configuration of switching between locked securing and releasing is utilized to automatically switch between transmitting and releasing rotational force of the common motor to the turret by switching between indexing and lock-securing the turret, and to switch between swiveling of the turret and rotation of the rotating tool.

The inventions according to the second, third, and fourth aspects provide a highly innovative composite processing machine which has an even simpler configuration, which can be configured inexpensively and compactly, and which has further improved practical applicability.

The invention according to the fifth aspect provides a highly innovative composite processing machine wherein even though the pneumatic turret slide mechanism may not produce drive force sufficient to directly withstand a large cutting force (lathe turning force), the weight of the turret or a large cutting force can be sufficiently borne by the wedge mechanism, whereby the use of oil pressure can be eliminated, energy can be conserved, and resource consumption can be limited without impeding turret swiveling or the cutting function, there is no need for an oil pressure reducing mechanism that would require a complicated design or controls as previously described due to elimination the use of oil pressure, a smooth swivel function of excellent durability can be easily ensured, the unclamping speed during swiveling is improved, and other advantages are obtained.

DESCRIPTION OF THE PREFERRED EMBODIMENTS

Figure 1:
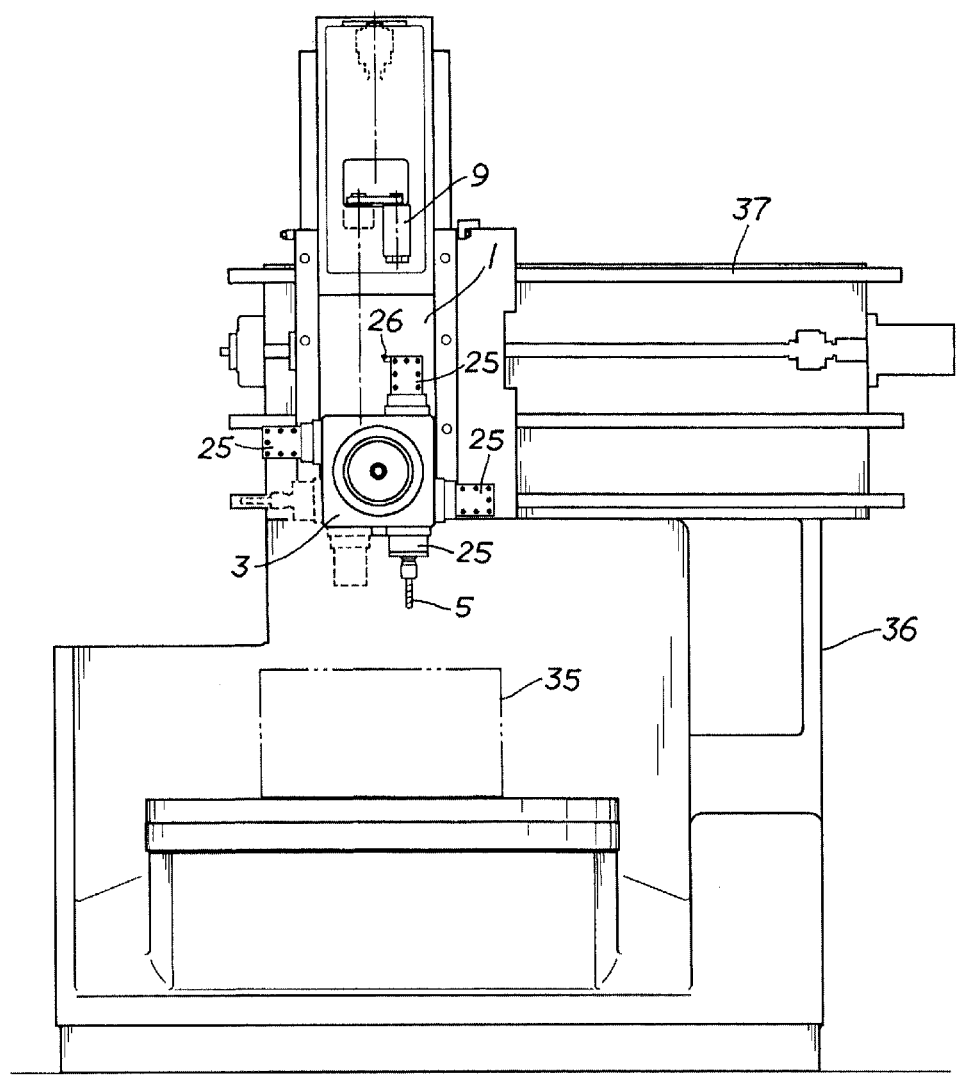
FIG. 1 is a schematic configuration front view of the present example.
Figure 2:
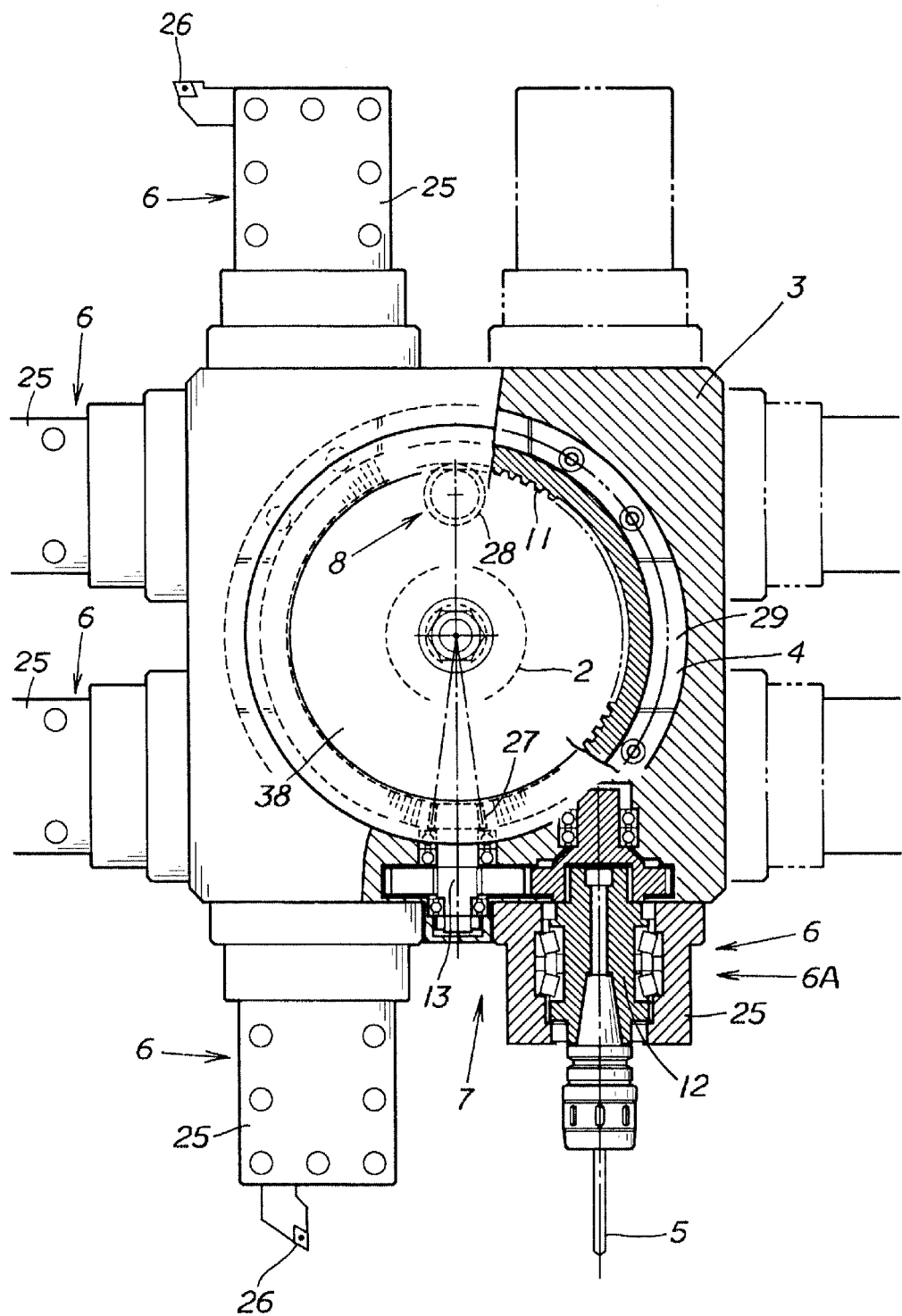
FIG. 2 is a front cross-sectional view omitting part of the turret of the present example.
Figure 3:
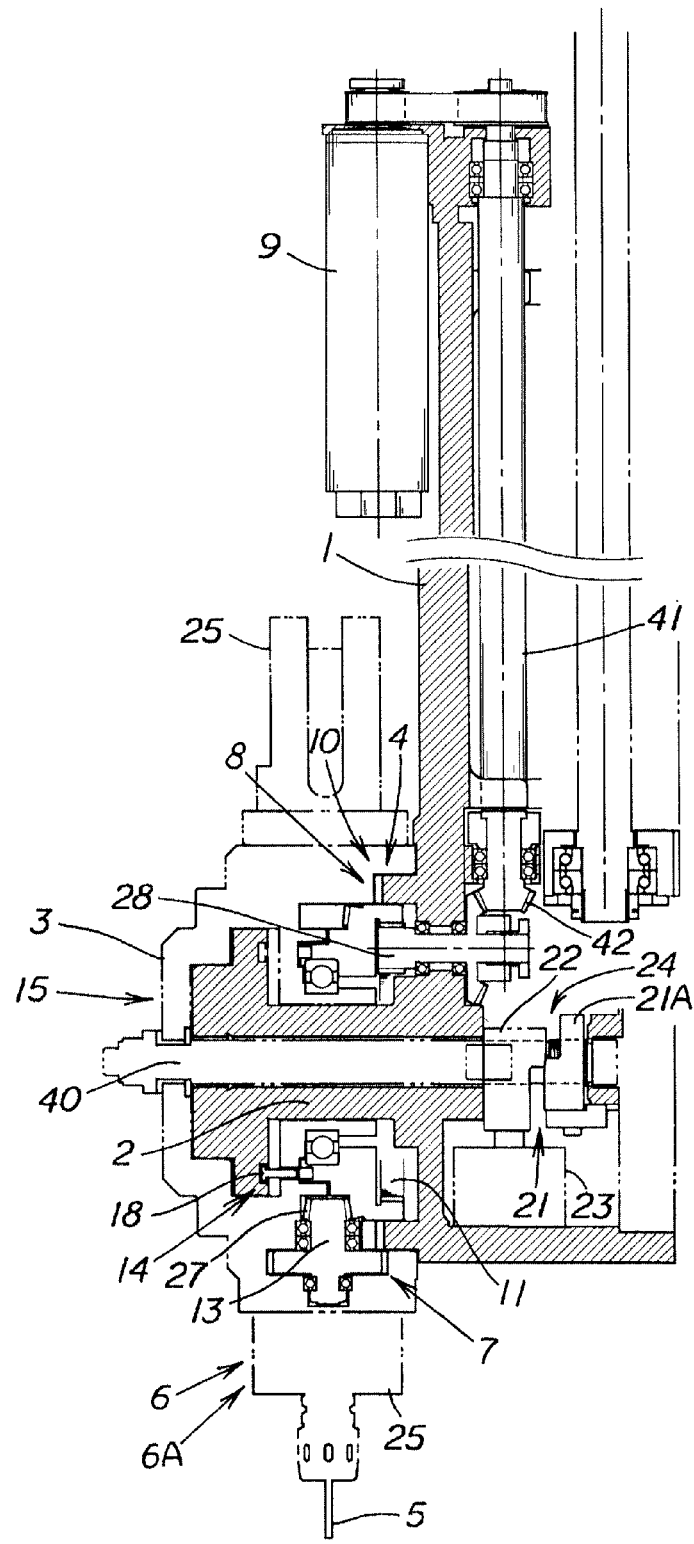
FIG. 3 is a schematic side cross-sectional view of the clamped state (when the indexed position is locked and secured and the rotating tool is rotated) of the present example.
Figure 4:
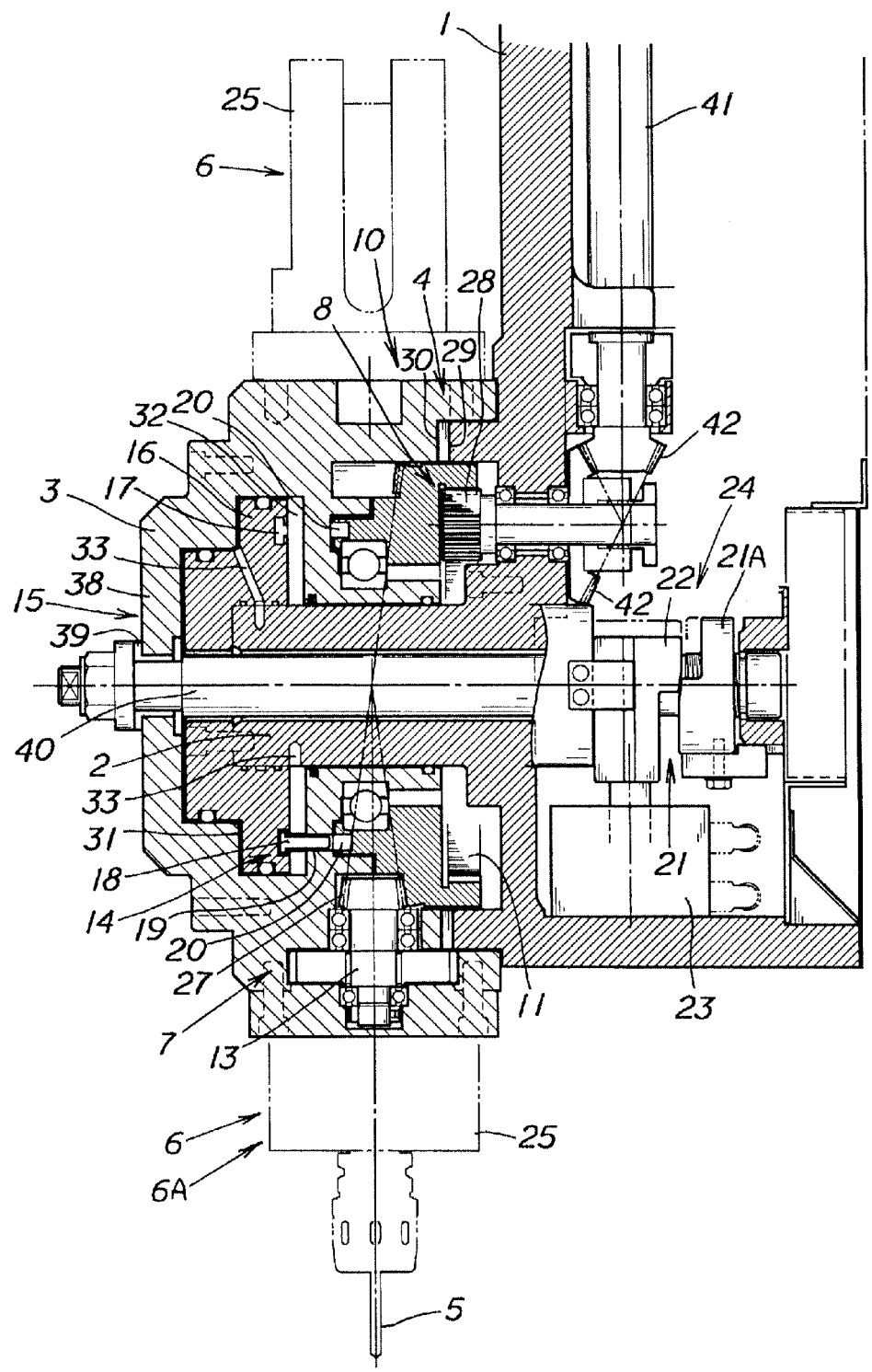
FIG. 4 is an explanatory side cross-sectional view of the clamped state (when the indexed position is locked and secured and the rotating tool is rotated) of the present example.
Figure 5:
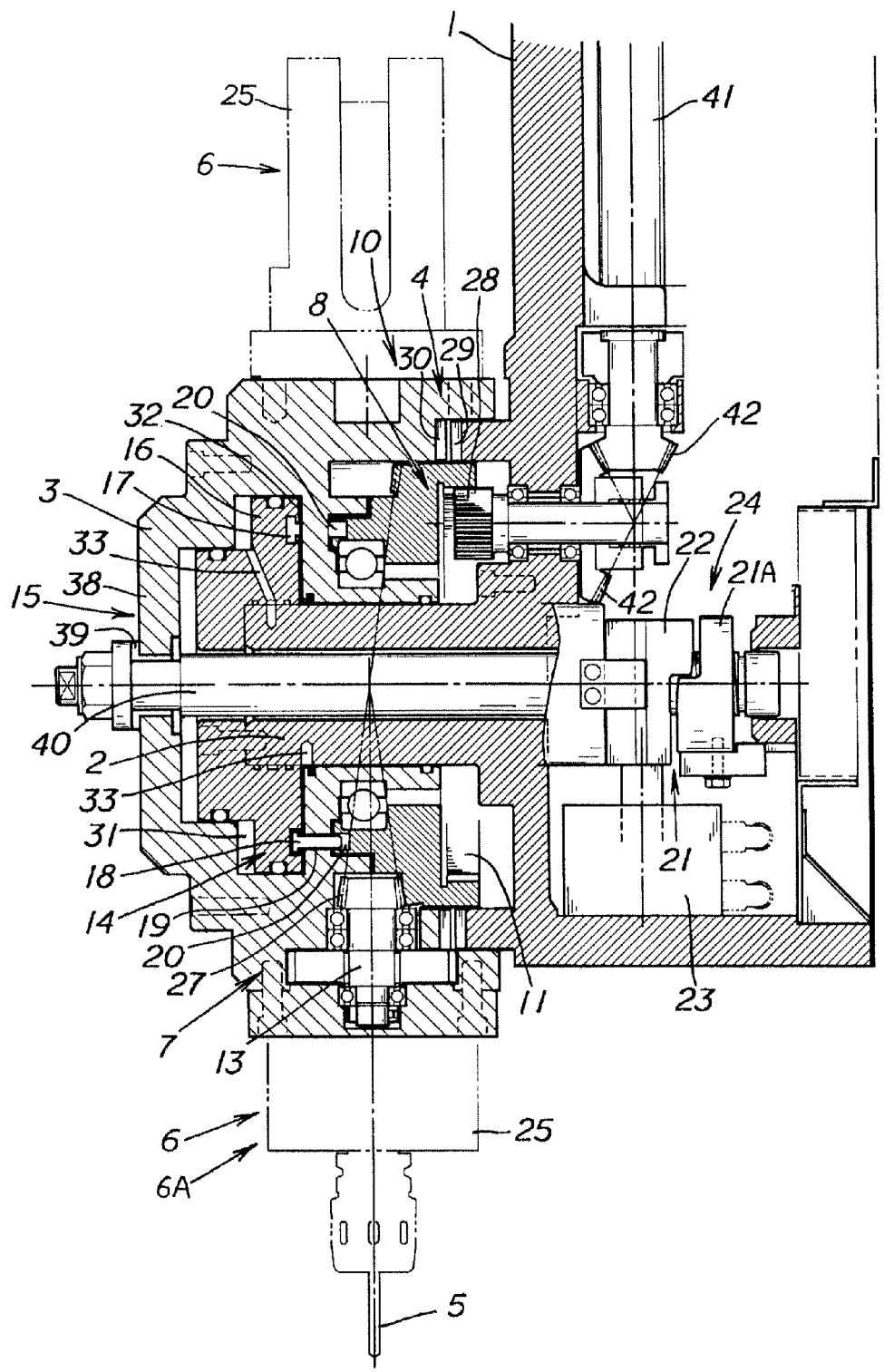
FIG. 5 is an explanatory side cross-sectional view of the unclamped state (a state in which the turret is slid until swivelable, and the turret is indexed by the common motor, without the rotating tool being rotated) of the present example.
Figure 6:
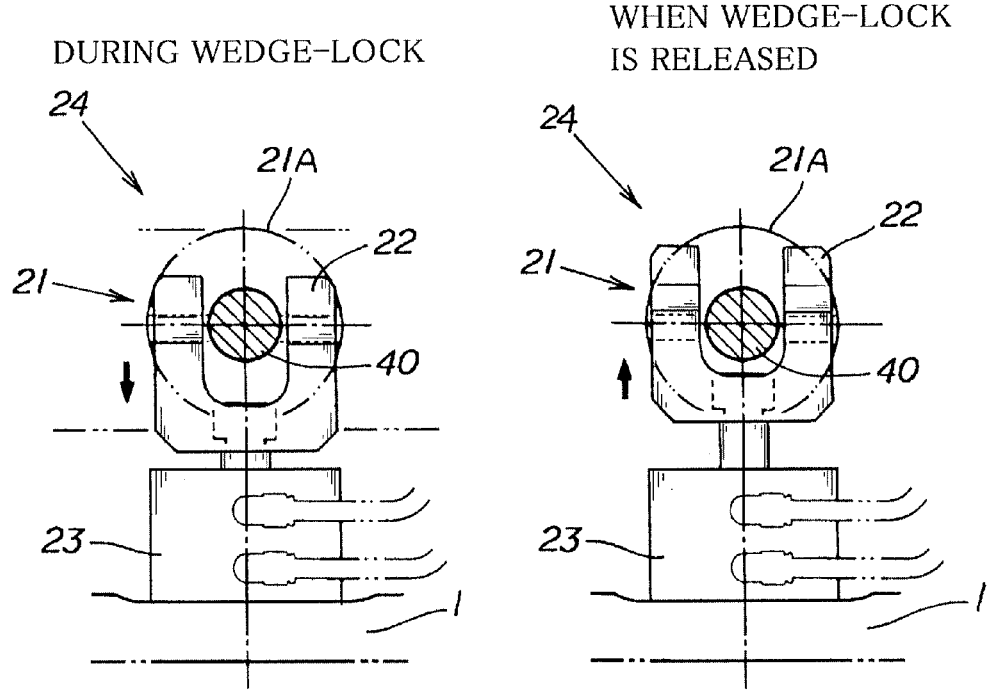
FIG. 6 contains action explanatory drawings of the wedge mechanism of the present example.
Figure 6:
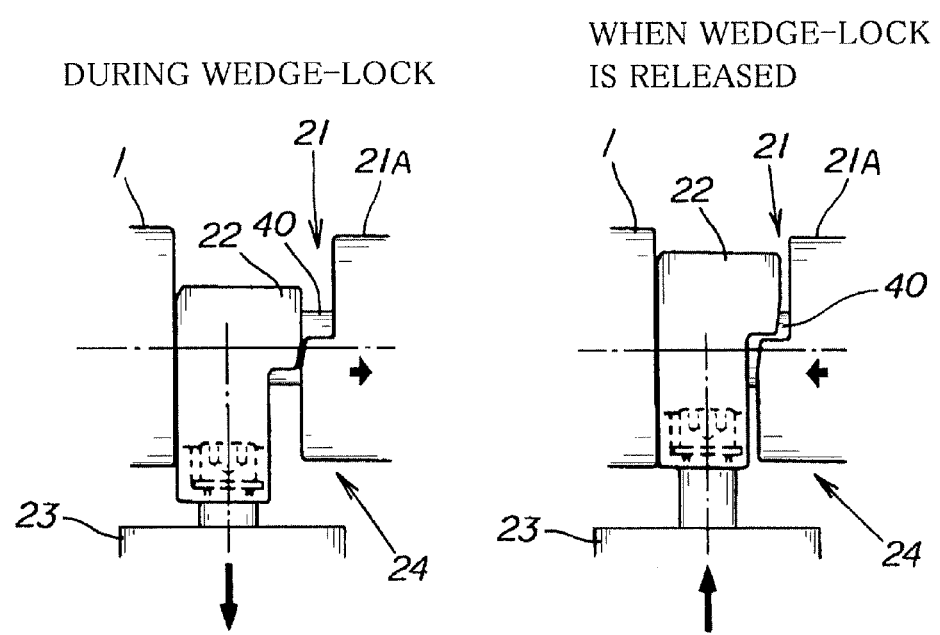
Figure 7:
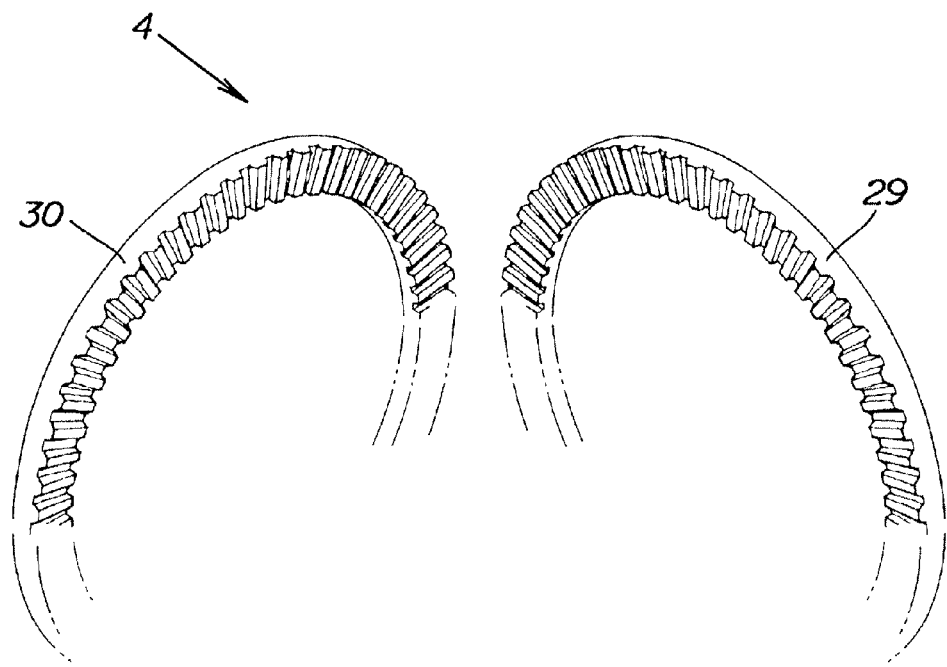
FIG. 7 contains explanatory drawings of a curvic coupling as the clutch device of the present example.
Figure 7:
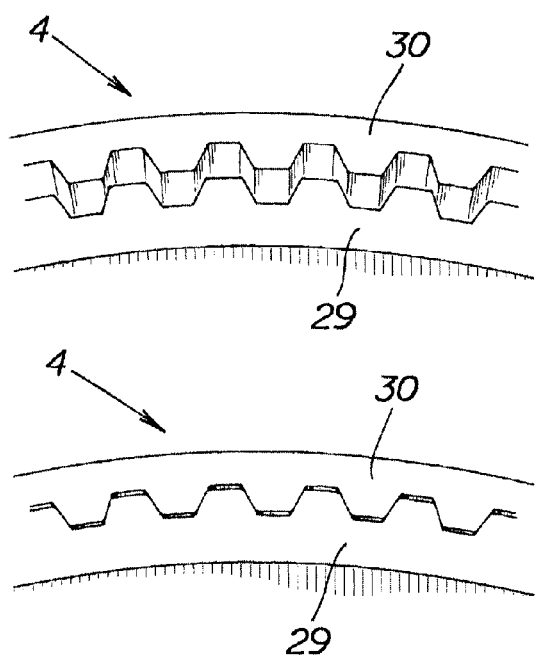
Figure 8:
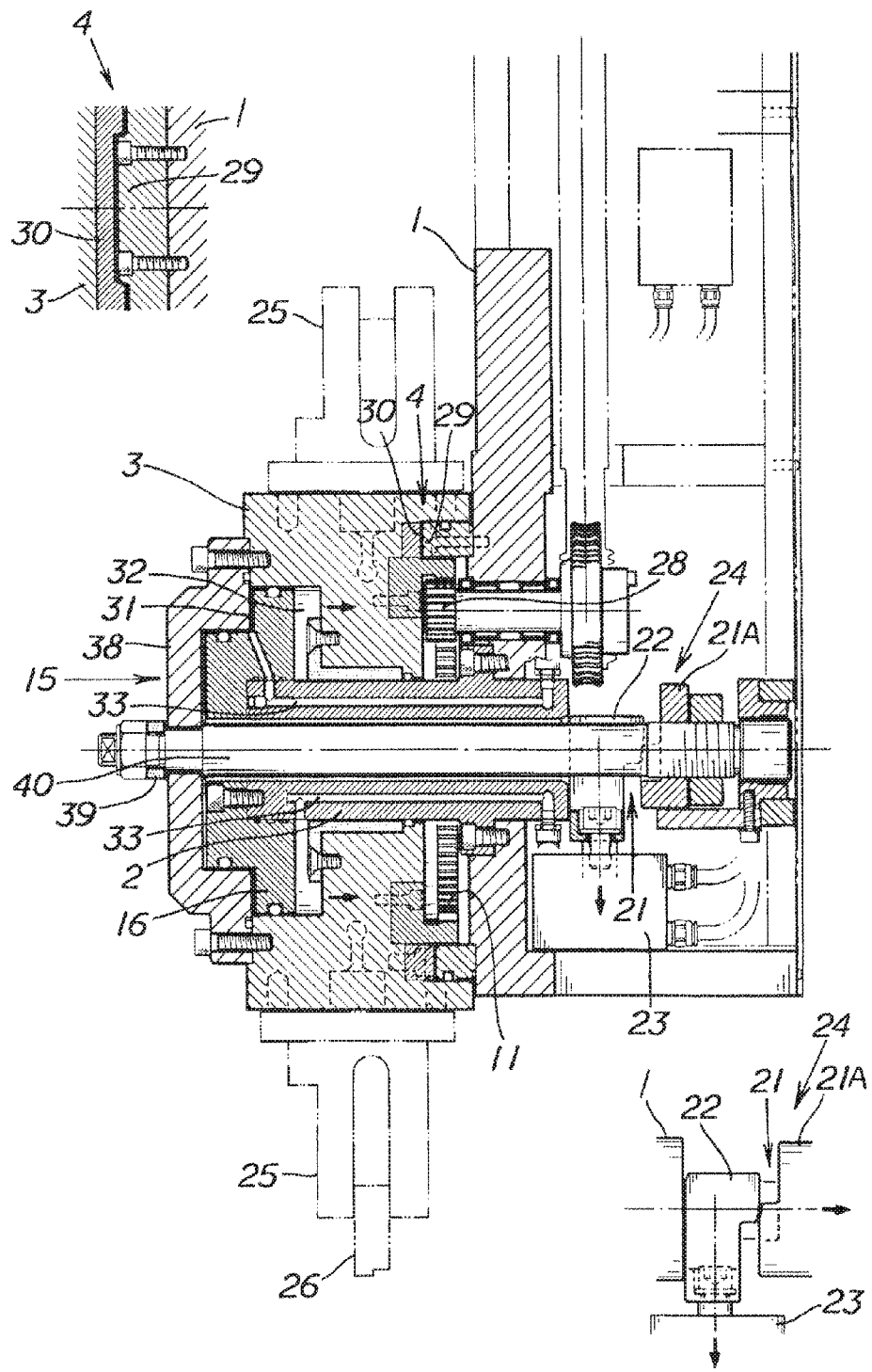
FIG. 8 is an explanatory cross-sectional view of a clamped state (when the indexed position has been locked and secured) of a conventional example.

Preferred embodiments of the present invention are described in a simple manner based on the drawings, with depiction of the effects of the present invention.

When a turret 3 is swiveled during the switching of a tool (a cutting tool 26 or a rotating tool 5 provided to a holder 25), first, a turret slide mechanism 15 that uses air as a drive system, for example, is actuated to slide the turret 3 in an axial direction and unlock a clutch device 4 (a clamped state), and a swivel-enabled state (an unclamped state) is implemented.

When air is channeled to a clutch-releasing pressure chamber 31 by an air supply device of the turret slide mechanism 15, for example, the turret 3 slides in the axial direction (from the proximal end to the distal end) while sandwiching a sliding movement gap 32 (a clutch pressure chamber 32), the inner surface of the sliding movement gap 32 stops upon contact with the opposing surface, the locked securing of the clutch device 4 (the clamped state) is released, and the swivel-enabled state (the unclamped state) is implemented.

In this unbalanced state (during the clutch-releasing action), after the turret 3 has been swiveled to change the tool, the turret 3 is slid back. For example, the channeling of air to the clutch-releasing pressure chamber 31 may be stopped, or conversely the air may be expelled and the turret may be slid back by the return elasticity of an elastic part, but the turret 3 is slid back by switching a solenoid valve and channeling air to the sliding movement gap 32 (the clutch pressure chamber 32) as in an example described hereinafter, for example, whereby the clutch device 4 is again engaged by concave and convex portions and the indexed position is locked and secured (the clamped state is resumed).

At this time, the clamped state is engaged in a wedged manner and held in a wedged manner by a wedge mechanism 24, for example. A wedge part 22 is moved by being driven or urged by a wedge drive device 23 and is engaged in a wedged manner with a wedge engagement part 21 which has been moved or widened by the back-sliding of the turret 3, for example, and the locked and secured state (the clamped state) of the clutch device 4 is held in a wedged manner (wedge-locked).

Thereby, the slidable driving of the turret 3 is achieved by air pressure, air pressure is also used for the reciprocating driving of the wedge part 22 to eliminate the use of oil pressure, the back-sliding is achieved by air pressure and is locked and secured by the clutch device 4 even if air pressure alone does not yield a clamping force sufficient to oppose a large cutting force unlike oil pressure, and the clamped state (during the clutch-locking action) is held in a wedged manner by the wedge mechanism 24, whereby even a large cutting force can be sufficiently withstood, and it is possible to eliminate the use of oil pressure.

Aside from whether or not the wedge mechanism 24 is used, to a turret device in which the turret 3 is slid to implement the unclamped state for the purpose of this turret indexing and the turret is slid back after the indexing to again implement the clamped state, the present invention adds a composite function for also performing actions such as boring and tapping.

Specifically, at least one tool attachment part 6 (tool holder attachment portion) provided to the turret 3 is configured as a rotating tool attachment part 6A having a tool rotating shaft 12 through which rotational force is transmitted to the mounted rotating tool 5, so that the tool can be switched to the rotating tool 5 or the tool angle can be changed by the indexing of the turret 3.

Specifically, the present invention has a configuration in which a rotation drive mechanism 7 is provided for transmitting rotational force to the rotating tool 5 (via the tool rotating shaft 12) mounted to the rotating tool attachment part 6A, a transmission rotating shaft 13 provided to the turret 3 is caused to rotate by the rotation drive mechanism 7, and the tool rotating shaft 12 for rotating the rotating tool 5 mounted to the rotating tool attachment part 6A is caused to rotate by the transmission.

The present invention has a configuration in which the rotation drive source of the rotation drive mechanism 7 and the swivel drive source of a swivel drive mechanism 8 for the indexing for swiveling the turret 3 are both a shared common motor 9, the configuration comprising an indexing control mechanism for performing turning amount control based on position detection.

Specifically, a servo motor or the like for indexing is not used, but a spindle motor or the like is used as the common motor 9, and the configuration comprises an indexing control mechanism (a CS control mechanism) wherein a turning amount can be detected and turning amount control can be performed for the purpose of indexing.

Therefore, in this configuration, the turret 3 is indexed by the swivel drive mechanism 8 which uses the common motor 9 as a drive source and the indexing control mechanism (the CS control mechanism), and the rotating tool 5 mounted to the rotating tool attachment part 6A is rotated via the transmission rotating shaft 13, the tool rotating shaft 12, and other components by the rotation drive mechanism 7 which uses the common motor 9 as a drive source.

The present invention provides a clutch-action-coupled rotational force transmission/release switching mechanism 10, configured so that when the turret 3 is slid along the swivel shaft part 2 to unlock the clutch device 4 and enable the turret 3 to swivel (when the unclamped state is implemented), the transmission of rotational force from the common motor 9 is transmitted to the turret 3, rotating the turret 3; and conversely, when the turret 3 is slid back in the indexed position of the turret 3 to lock and secure the clutch device 4 (when the clamped state is implemented), transmission of the rotational force of the common motor 9 to the turret 3 is released, whereby the rotational force of the common motor 9 is transmitted by the rotation drive mechanism 7, and the rotating tool 5 is rotated.

Specifically, when the turret 3 is slid along the swivel shaft part 2 by the turret slide mechanism 15, for example, in order to index the turret 3, the turret 3 is swiveled by the rotational force of the common motor 9 due to the rotational force transmission/release switching mechanism 10, but the transmission rotating shaft 13 for transmission-rotating the tool rotating shaft 12 for rotating the rotating tool 5 does not rotate (the rotating tool 5 does not rotate), and merely swivels in tandem with the turret 3.

In other words, when the turret 3 is allowed to swivel by the rotational force transmission/release switching mechanism 10 (during the unclamped state in which the locking of the clutch device 4 is released), rotational force of the common motor 9 is transmitted to the turret 3 in conjunction with the clutch unlocking action (in conjunction with the sliding action of the turret 3), but the tool rotating shaft 12 does not rotate, and through the common motor 9, the turret 3 is swiveled and indexed by the swivel drive mechanism 8 and the indexing control mechanism.

After indexing, when the turret 3 has been slid back and the clutch device 4 has been locked and secured (when the clamped state of locking and securing the clutch device 4 is implemented), the indexed position of the turret 3 is locked and secured by the clutch device 4 as well as the wedge mechanism 24, for example, in conjunction with the clutch locking and securing action (in conjunction with the back-sliding action of the turret 3), transmission of the rotational force of the common motor 9 to the turret 3 by the transmission/release switching mechanism 10 is released, thereby automatically switching to a state in which the rotational force of the common motor 9 is transmitted to the transmission rotating shaft 13 and the tool rotating shaft 12, the tool rotating shaft 12 and the transmission rotating shaft 13 of the rotation drive mechanism 7 are caused to rotate by the rotational force of the common motor 9 in the indexed position, and the rotating tool 5 mounted to the rotating tool attachment part 6A is rotated via this tool rotating shaft 12.

Thus, the present invention is an innovative composite processing machine comprising an automatic swiveling composite turret device which can have an inexpensive and compact design, wherein a lock securing/releasing switching configuration of a clutch device 4 is used (in conjunction with the sliding action of the turret 3 when the turret 3 is clamped and unclamped) to automatically switch between transmitting and releasing rotational force of the common motor 9 to the turret 3, specifically, in accordance with the switching between indexing and lock-securing the turret, and switch between swiveling of the turret and rotation of the rotating tool.

EXAMPLES

Specific examples of the present invention are described based on the drawings.

In the present example, the present invention is applied to an automatic swiveling turret device of a machine tool such as a vertical lathe, wherein tools are respectively provided to all sides of a turret 3 (a cutting tool 26 and a rotating tool 5 which can be replaced are provided to respective holders 25) which is moveably controlled in directions X, Y, and Z relative to a workpiece 35 via a column 36, a cross rail 37, and a turret head 1 as shown in FIG. 1, and if the turret 3 is square shaped, for example, the turret 3 is indexed in 90 degree increments relative to the turret head 1 to switch the tool being used.

Specifically, as has already been described in detail in the conventional example, the basic configuration of the turret device of the present example has a swivel shaft part 2 provided to the turret head 1, a turret 3 provided to the swivel shaft part 2 and capable of swiveling and sliding in an axial direction, and a clutch device 4 which locks and secures the indexed position of the turret in a disengageable manner by the axial sliding of the turret 3.

To provide composite functions such as boring or tapping, at least one of the tool attachment parts 6 provided to the turret 3 is a rotating tool attachment part 6A through which rotational force is transmitted to the mounted rotating tool 5.

Specifically, in this configuration, one or more tool holders 25 are provided as tool attachment parts 6 to all sides of the turret 3, of which at least one is a rotating tool attachment part 6A for mounting the rotating tool 5, the tool rotating shaft 12 for rotating the rotating tool 5 is provided to a holder 25, the holder 25 meshes with the tool rotating shaft 12 when the holder 25 is provided, and a transmission rotating shaft 13 for rotating the tool rotating shaft 12 by transmission is provided to the turret 3, wherein the tool can be switched or the tool angle can be changed by indexing the turret 3.

The present example has a configuration in which the rotation drive source of the rotation drive mechanism 7 for transmitting rotational force to the rotating tool 5 mounted to the rotating tool attachment part and the swivel drive source of the swivel drive mechanism 8 for swiveling the turret 3 are both a shared common motor 9, the configuration comprising an indexing control mechanism for performing turning amount control based on position detection.

Specifically, a servo motor or the like for indexing is not used, but a spindle motor or the like is used as the common motor 9, and the configuration comprises an indexing control mechanism (a CS control mechanism) wherein a turning amount can be detected and turning amount control can be performed for the purpose of indexing.

Therefore, in this configuration, a transmission gear 11 is swiveled to index the turret 3 by the swivel drive mechanism 8 which uses the common motor 9 as a drive source and the indexing control mechanism (the CS control mechanism), the transmission gear 11 is caused to rotate by the rotation drive mechanism 7 which uses the common motor 9 as a drive source, and through the switching of a connect-release switching device 14 described hereinafter, the transmission rotating shaft 13 and tool rotating shaft 12 are caused to rotate by transmission by the rotation of the transmission gear 11 to rotate the rotating tool 5 mounted to the rotating tool attachment part 6A.

Specifically, in the present example, the rotation drive mechanism 7 is provided with a clutch-action-coupled rotational force transmission/release switching mechanism 10, whereby the rotational force of the common motor 9 is transmitted to the turret 3, swiveling the turret 3, when the turret 3 is slid along the swivel shaft part 2 to unlock the clutch device 4 and enable the turret 3 to swivel; and conversely, when the turret 3 is slid back to lock and secure the clutch device 4 in the indexed position of the turret 3, transmission of the rotational force of the common motor 9 to the turret 3 is released, whereby the rotational force of the common motor 9 is transmitted by the rotation drive mechanism 7, and the rotating tool 5 rotates.

Specifically, the transmission gear 11 (an internal gear) is rotatably provided along with the turret 3 to the swivel shaft part 2, and the turret slide mechanism 15 is provided for sliding the turret 3 and the transmission gear 11 back and forth along the swivel shaft part 2.

The turret slide mechanism 15, which uses air as described in detail in the conventional example, is configured so as to slide the turret 3 back and forth along the swivel shaft part 2 together with the transmission gear 11 through switching the supply of air.

A small transmission gear 28, which is rotated within the turret 3 via a common rotating shaft 41 and a bevel gear 42 caused to rotate by the common motor 9 which uses the spindle motor, is meshed with the transmission gear 11 (an internal gear), and even if the transmission gear 11 slides along the swivel shaft part 2 relative to the small transmission gear 28, the meshing is maintained and the transmission gear 11 is caused to rotate by the common motor 9 (by the rotation of the small transmission gear 28).

The transmission gear 11 has a configuration in which an internal gear part that meshes with the small transmission gear 28 is provided at the bottom, and a bevel gear part is provided at the top, the bevel gear part and a transmission bevel gear 27 at the end of the transmission rotating shaft 13 provided to the turret 3 mesh, and when the transmission gear 11 rotates while the turret 3 is locked and secured, the transmission rotating shaft 13 provided to the turret 3 rotates due to the meshing between the bevel gear part and the transmission bevel gear 27.

Specifically, the rotation drive mechanism 7 is configured such that the transmission rotating shaft 13 is provided so as to meshably connect with the tool rotating shaft 12 of the rotating tool attachment part 6A provided to the turret 3, the transmission rotating shaft 13 and the transmission gear 11 meshably connected as previously described, the transmission rotating shaft 13 provided to the turret 3 is caused to rotate by the transmission gear 11 for rotating the swivel shaft part 2 on an axis relative to the turret 3, and the tool rotating shaft 12 of the rotating tool attachment part 6A is caused to rotate by transmission to rotate the rotating tool 5 mounted to the rotating tool attachment part 6A.

In the present example, the rotational force transmission/release switching mechanism 10 is configured so that the connect-release switching device 14 for connecting and integrally rotating the transmission gear 11 and the turret 3 is provided so as to be capable of connecting and releasing, and when the turret 3 is slid along the swivel shaft part 2 to unlock the clutch device 4 and enable the turret 3 to swivel, the connect-release switching device 14 undergoes the connecting action in conjunction with the clutch releasing action, the transmission gear 11 and the turret 3 connect and swivel integrally, the turret 3 is indexed by the transmission gear 11, and the transmission rotating shaft 13 provided to the swiveling turret 3 and the tool rotating shaft 12 provided to the rotating tool attachment part 6A do not rotate, the connect-release switching device 14 undergoes a connection release action, releasing the connection of the transmission gear 11 and the turret 3, and in a state in which the turret 3 is locked and secured by the clutch device 4, the transmission gear 11 rotates, whereby the transmission rotating shaft 13 is transmission-rotated, the tool rotating shaft 12 of the rotating tool attachment part 6A is transmission-rotated by this transmission rotating shaft 13, and the rotating tool 5 mounted to this rotating tool attachment part 6A rotates.

Moreover, specifically, when the turret 3 slides back and the clutch device 4 is locked and secured (when the clamped state has been implemented), in present example, a wedge lock is enacted by the wedge mechanism 24, as described in detail in the conventional example, to achieve a configuration free of oil pressure.

Specifically, the present example comprises the wedge mechanism 24 which is provided with the wedge engagement part 21 which is moved or widened by the back-sliding of the turret 3, and the wedge part 22 which engages with the wedge engagement part 21, and which is configured so that the wedge part 22 is engaged with the wedge engagement part 21 by the driving of the wedge drive device 23 (the wedge part may be moved by urging), whereby the turret 3, which has back-slid into a processing position where it is locked and secured by the clutch device 4 and cannot swivel, is held by a wedge engagement.

In the present example, due to the presence of the wedge mechanism 24, the turret 3 is slid by the turret slide mechanism 15 by air pressure driving to lock and secure or release the clutch device 4, the locked and secured state of the clutch is wedge-locked by the wedge mechanism 24 by air pressure driving, and the elimination of oil pressure is intended as previously described.

The present example, which applies the present invention to this turret device, is specifically configured so that the rotating tool 5 is rotated via components such as the transmission rotating shaft 13 and tool rotating shaft 12 of the rotation drive mechanism 7 caused to rotate by the common motor 9 as previously described, the transmission gear 11 and the turret 3 are connected by the connect-release switching device 14, and the transmission gear 11 is switched from a state of rotating by transmission relative to the turret 3 to a state of swiveling integrally with the turret 3.

Specifically, the configuration is designed so that when the turret 3 is slid back to lock and secure the clutch device 4 in the indexed position of the turret 3 (when the clamped state is implemented), the connect-release switching device 14 undergoes the connecting or releasing action in conjunction with the clutch locking action, the transmission gear 11 is enabled to rotate about the swivel shaft part 2 as an axis relative to the turret 3 on inside of the turret 3, the transmission gear 11 is caused to rotate by the common motor 9 via the small transmission gear 28, and the transmission rotating shaft 13 provided to the turret 3 is turned by transmission by the transmission gear 11 via the transmission bevel gear 27, whereby the tool rotating shaft 12 is caused to rotate by transmission and the rotating tool 5 rotates.

When the turret 3 is slid along the swivel shaft part 2 to unlock the clutch device 4 and enable the turret 3 to swivel (when the unclamped state is implemented), the connect-release switching device 14 undergoes the connecting action in conjunction with the clutch releasing action, implementing a state in which the transmission gear 11 and the turret 3 connect and swivel integrally.

Therefore, the rotational force transmission/release switching mechanism 10 is configured so that the transmission gear 11 is integrated with the turret 3 and caused to rotate by transmission by the common motor 9 about the swivel shaft part 2 as an axis, the turret 3 is indexed by the rotation of the transmission gear 11, and the transmission rotating shaft 13 provided to the turret 3, which swivels integrally with the transmission gear 11, does not rotate (the rotating tool 5 does not rotate), and merely swivels in tandem with the turret 3.

To further describe the connect-release switching device 14 of the present example, in the present example, a connecting pin 18 capable of moving in a circle is provided in a retained manner to an annular attachment part 17 provided to an overhanging part 16 of the swivel shaft part 2, and the connecting pin 18 is inserted through a through-hole 19 provided to the turret 3.

Having been inserted through the through-hole 19 of the turret 3, the connecting pin 18 can be inserted into and withdrawn from locking holes 20 of the transmission gear 11 provided inside the turret 3, the connecting pin 18 is disengaged from the locking holes 20 by the integral sliding reciprocation of the turret 3 and the transmission gear 11, and when the connecting pin 18 is inserted into the locking holes 20 of the transmission gear 11 by the sliding of the turret 3, the turret 3 and the transmission gear 11 connect to implement a state of integral swiveling relative to the swivel shaft part 2, and the common motor 9 and the CS control mechanism cause the turret 3 to be indexed by the swiveling of the transmission gear 11. Conversely, when the turret 3 is slid back and taken out, the transmission gear 11 rotates relative to the turret 3 locked and secured to the turret head 1 (the swivel shaft part 2 and the overhanging part 16) by the clutch device 4 and the transmission rotating shaft 13 and tool rotating shaft 12 rotate, whereby the rotating tool 5 rotates.

To give a more detailed description, the present example is configured so that the proximal end head of the connecting pin 18 is retained in the annular attachment part 17 provided to the overhanging part 16 of the swivel shaft part 2 and made to protrude so as to be able to circle along the annular attachment part 17, the connecting pin 18 is inserted through the through-hole 19 of the turret 3, and even if the through-tip protruding through the through-hole 19 is chamfered and there is some backlash, the tip is reliably inserted and locked in the locking holes 20 provided to the transmission gear 11. The locking holes 20 are provided to all indexed positions. For example, when the turret 3 is indexed in 90 degree increments in a square pattern, the locking holes 20 are provided to four indexed positions; when the rotating tool 5 is rotated, the transmission gear 11 is rotated to and stopped at the original indexed position by an orientation function; and when the transmission gear 11 is slid together with the turret 3, the connecting pin 18 is reliably inserted into a locking hole 20 to cause the turret 3 and the transmission gear 11 to swivel integrally, whereby transmission to the rotating tool 5 is released and an indexed state is implemented.

The present embodiment has a configuration in which two holders 25 each are provided to the outer surfaces of the turret 3, and when the holder 25 is a rotation tool holder 25 having the tool rotating shaft 12, the transmission rotating shaft 13 and the tool rotating shaft 12 provided facing the turret surface inside the turret 3 and provided in the middle of the turret outer surface are meshably connected, two rotating tools 5 are provided in the turret outer surface, and if transmission rotating shafts 13 are thus provided in all sides of the turret 3, more rotating tools 5 can be attached.

The clutch device 4 of the present example is configured with a coupling part (a curvic coupling) provided between the turret head 1 and the turret 3. Specifically, the configuration is designed so that clutch locking parts 29 are provided in four places on the periphery of the swivel shaft part 2 of the turret head 1, clutch engagement parts 30 for engaging with the clutch locking parts 29 by rotation-stopping concave and convex parts are provided to the proximal end periphery of the turret 3, the engaging of the clutch locking parts 29 and clutch engagement parts 30 is released to allow the turret 3 to swivel when the turret 3 slides from the proximal end to the distal end, and when the turret 3 slides back, the rotation-stopping engagement (the locked securing) again takes effect at the 90 degree incremental indexed positions to stop the turret 3 from swiveling.

The turret slide mechanism 15 of the present example has a configuration composed of an air supply device for driving the sliding as previously described, a clutch-releasing pressure chamber 31 for causing the turret 3 to slide in the axial direction and releasing the locked securing of the clutch device 4 by channeling air through the air supply device, and the sliding movement gap 32 enclosed by the clutch-releasing sliding of the turret 3, the sliding movement gap also being a clutch pressure chamber 32 to which air is conversely channeled from the air supply device by the switching of a solenoid valve, whereby the turret 3 is slid back and again locked and secured by the clutch device 4.

To give a further description, in the present example, the overhanging part 16 which hangs out in an umbrella shape is provided to the distal end periphery of the swivel shaft part 2, and the turret 3 is configured so that in both the proximal end side (the turret head side) and the distal end side (the front surface side) of the overhanging part 16, which together with the swivel shaft part 2 acts as a securing part, gaps are formed which are widened and narrowed by the sliding of the turret 3 and which are sealed by a mutual O ring or the like to achieve complete separation.

Specifically, the configuration is designed so that part of the inner surface of the turret 3 is in slidable contact in an airtight state with the external peripheral surface of the overhanging part 16 via an O ring, the turret 3 is configured into a shape that covers both the distal end side and proximal end side of the overhanging part 16 via the gap, one gap formed by the turret 3 and the ridged surface at the distal end of the overhanging part 16 constitutes the clutch-releasing pressure chamber 31, another gap formed by the turret 3 and the proximal end surface of the overhanging part 16 constitutes a clutch pressure chamber 32 which is the aforementioned sliding movement gap 32, air is channeled to the clutch-releasing pressure chamber 31 by the air supply device via an air supply channel 33 provided to the swivel shaft part 2 and the overhanging part 16, thereby pushing the clutch-releasing pressure chamber 31 open and causing the turret 3 to slide to the distal end relative to the overhanging part 16 on the secured side to unlock the clutch device 4, and air is conversely channeled to the clutch pressure chamber 32, thereby pushing the clutch pressure chamber 32 open and causing the turret 3 to slide back to the proximal end relative to the overhanging part 16 on the secured side to lock and secure the indexed position of the turret 3 through the clutch device 4.

In the present example, the wedge mechanism 24 is included, which is provided with the wedge engagement part 21 which is moved or widened by the back-sliding of the turret 3 and the wedge part 22 which engages with the wedge engagement part 21 as previously described, and the wedge mechanism 24 is configured so that the wedge part 22 is moved by the driving or urging of the wedge drive device 23 and engaged with the wedge engagement part 21, thereby creating a wedged lock-holding (a wedge-lock) on the turret 3 which has back-slid into a processing position of being locked and secured by the clutch device 4 and unable to swivel.

Specifically, in the present example, the swivel shaft part 2 has a hollow structure, and inside the swivel shaft part 2 is provided a sliding shaft part 40 which moves with the sliding of the turret 3. Specifically, the sliding shaft part 40 is passed through the overhanging part 16 and the swivel shaft part 2 via a sliding shaft bearing part 39 of the turret 3 which covers the distal end side of the overhanging part 16, and the wedge engagement part 21 is provided to the proximal end of the sliding shaft part 40 which is passed through from the swivel shaft part 2.

In the present example, the wedge engagement part 21 is configured from the proximal end surface of the swivel shaft part 2 and a wedge engagement part forming part 21A provided to the sliding shaft part 40. Specifically, the wedge mechanism 24 is configured so that the wedge engagement part forming part 21A is provided to the proximal end of the sliding shaft part 40, the wedge engagement part 21 is provided by the wedge engagement part forming part 21A and the proximal end of the swivel shaft part 2, and the wedge engagement part 21 is widened and narrowed by the axial sliding of the turret 3 for the locked securing and unlocking of the clutch device 4 (by the sliding of the sliding shaft part 40 and the sliding of the wedge engagement part forming part 21A).

To repeat the description, the configuration is designed so that releasing the wedged locking of the wedge engagement part 21 and the wedge part 22 makes it possible for the turret 3 to slide for releasing the clamped state, the wedge engagement part forming part 21A moves relative to the proximal end of the swivel shaft part 2 at the secured side and the wedge engagement part 21 is narrowed (in the present example, the engagement hole width of the wedge engagement part 21 is narrowed while the wedge part 22 remains engaged in the wedge engagement part 21) by the sliding of the sliding shaft part 40 due to the sliding of the turret 3, and the wedge engagement part 21 conversely widens and pushes the wedge part 22 in due to the back-sliding of the turret 3 (in the present example, the wide part of the wedge part 22 is pulled and moved from the wide part to the narrow part of the wedge engagement part 21 and made to dig into the narrow part), whereby a wedge-lock can be created.

The wedge engagement part forming part 21A is configured to be threaded onto a proximal end screw part of the sliding shaft part 40, and the position thereof can be adjusted. Specifically, the position of the wedge engagement part 21 can be adjusted, but in the present example, the wedge engagement part forming part 21A can be movably adjusted relative to the secured side and the engagement hole width of the wedge engagement part 21 can be finely adjusted.

The wedge mechanism 24 of the present example is configured so that the wedge part 22 is driven back and forth by the wedge drive device 23 to create a wedged engagement with the wedge engagement part 21. Specifically, the present example is configured so that the wedge drive device 23 drives back and forth without using elastic force (an air cylinder device is employed), the wedge part 22 is driven both back and forth by air pressure, and the wedge part 22 is engaged by pulling in the wedge engagement part 21 which has been widened by the back-sliding of the turret 3 as previously described.

Specifically, the configuration is designed so that the wedge engagement part 21 and the wedge part 22 are both shaped having wide parts and narrow parts as previously described, and after the unclamped state in which there is leeway between the two (when the wedge lock has been released) but less than in the engaged state, the turret 3 is slid back during clamping to widen the engagement hold width of the wedge engagement part 21, and the wide part of the wedge part 22 is dug into and engaged with (wedge locked in) the narrow part of the wedge engagement part 21 by pulling. Thus, the section of digging contact between the narrow part of the wedge engagement part 21 and the wide part of the wedge part 22 where the wedge-lock is achieved is tapered so that the wedge locking is smooth and the two parts are engaged firmly together.

The present invention is not limited to the present example, and specific configurations of the configurational requirements can be altered as appropriate.

What is claimed is:

1. A composite processing machine, comprising:
   a swivel shaft part provided to a turret head,
   a turret provided to the swivel shaft part so as to be capable of swiveling about a swivel axis and axially sliding along the swivel shaft part,
   a clutch device for locking and securing the turret in an indexed position about the swivel axis, in a manner allowing disengaging of the securing via the axial sliding of the turret,
   at least one tool attachment part provided to the turret, the at least one tool attachment part a rotating tool attachment part whereby rotational force is transmitted to a rotating tool mounted to the at least one rotating tool attachment part, and the tool can be switched or an angle of the tool can be changed by indexing of the turret about the swivel axis;
   a clutch-action-coupled rotational force transmission and release switching mechanism, in which a shared common motor is used for both a rotation drive source of a rotation drive mechanism for transmitting the rotational force to the rotating tool mounted to the at least one rotating tool attachment part, and is used for a swivel drive source of a swivel drive mechanism for swiveling the turret about the swivel axis, and
   an indexing control mechanism for performing turning amount control based on position detection,
   a transmission gear configured to be rotated by the common motor;
   wherein the turret is indexed by the swivel drive mechanism having the common motor as the swivel drive source,
   wherein the rotating tool mounted to the at least one rotating tool attachment part is caused to rotate relative to the turret by the transmission gear and by the rotation drive mechanism having the common motor as the rotation drive source,
   wherein rotational force from the common motor is transmitted to the transmission gear and the turret, when the turret and the transmission gear are axially slid along the swivel shaft part to unlock the clutch device and to enable the turret to swivel integrally with the transmission gear about the swivel axis, and
   wherein, conversely, when the turret is axially slid back in the indexed position of the turret to lock and secure the clutch device, the transmission of rotational force of the common motor to the turret is released, whereby the rotational force of the common motor is transmitted to the rotation driving mechanism by the transmission gear, causing the rotating tool to rotate.

2. The composite processing machine according to claim 1, wherein the rotational force transmission and release switching mechanism is configured so that the turret is swivelably provided to the swivel shaft part, the rotation drive mechanism is configured so as to cause a tool rotating shaft of the at least one rotating tool attachment part to transmission-rotate and cause the rotating tool mounted to the at least one rotating tool attachment part to rotate by the transmission gear which rotates relative to the turret about the swivel shaft part,
   the composite processing machine further comprising:
   a connect-release switching device, whereby the transmission gear and the turret are connected and caused to integrally rotate, is provided in a connectable and releasable manner,
   and wherein when the turret slides along the swivel shaft part to unlock the clutch device and enable the turret to swivel, the connect-release switching device undergoes a connecting action in conjunction with the clutch releasing action produced by the sliding of the turret, the transmission gear and the turret connect and swivel integrally, the turret is indexed by the transmission gear, and the tool rotating shaft of the at least one rotating tool attachment part provided to the swiveling turret does not rotate,
   and wherein when the connect-release switching device undergoes a connection release action in conjunction with the clutch action due to sliding of the turret when the turret is slid back, the turret is locked and secured by the clutch device, and the connection of the transmission gear and the turret is released, and
   wherein in a state in which the turret is locked and secured by the clutch device, the transmission gear rotates, whereby the tool rotating shaft of the at least one rotating tool attachment part is transmission-rotated, and the rotating tool mounted to the at least one rotating tool attachment part rotates.

3. The composite processing machine according to claim 2, wherein the rotational force transmission and release switching mechanism is configured so that, when the turret is released by the clutch device, the transmission gear is rotatable together with the turret relative to the swivel shaft part, the composite processing machine further comprising a turret slide mechanism for axially sliding the turret and the transmission gear back and forth along the swivel shaft part, wherein when the turret is axially slid to the indexed position to lock and secure the clutch device, the connect-release switching device undergoes a connection-releasing action, the transmission gear is enabled to rotate relative to the turret on the inner side of the turret and is caused to rotate by transmission by the common motor, a transmission rotating shaft provided to the turret is turned by transmission by the transmission gear, and the tool rotating shaft of the at least one rotating tool attachment part provided to the turret is transmission-rotated by the transmission rotating shaft, rotating the rotating tool mounted to the at least one rotating tool attachment part, and wherein when the turret axially slides along the swivel shaft part to unlock the clutch device and enable the turret to swivel, the connect-release switching device undergoes a connecting action in conjunction with the clutch releasing action produced by this sliding of the turret, the transmission gear and the turret connect to swivel integrally and to be rotated by transmission by the common motor, the turret is indexed by the transmission gear, and the transmission rotating shaft and the tool rotating shaft of the at least one rotating tool attachment part provided to the turret, which swivel integrally with the transmission gear, do not rotate relative to the turret, wherein when the connect-release switching device undergoes a connection release action in conjunction with the clutch action due to sliding of the turret, the connection of the transmission gear and the turret is released, and wherein in a state in which the turret is locked and secured by the clutch device, the transmission gear rotates, whereby the transmission rotating shaft is transmission-rotated, the tool rotating shaft of the at least one rotating tool attachment part is transmission-rotated by the transmission rotating shaft, and the rotating tool mounted to the at least one rotating tool attachment part rotates.

4. The composite processing machine according to claim 3, wherein the connect-release switching device is configured so that a connecting pin provided, so as to be capable of moving in a circle, to an annular attachment part provided to an overhanging part of the swivel shaft part is passed through a through-hole provided in the turret, wherein the connecting pin passed through the through-hole is provided to a locking hole of the transmission gear, which locking hole is provided on the inner side of the turret, the connecting pin being capable of being disengaged from the transmission gear via the integral axial sliding of the turret and the transmission gear along the swivel shaft part, and wherein when the clutch device is unlocked by the sliding of the turret, enabling the turret to swivel, the connecting pin is inserted into the locking hole of the transmission gear, and the turret and the transmission gear connect and swivel integrally relative to the swivel shaft part, producing a coupling action of the connecting pin and the transmission gear in conjunction with the clutch releasing action due to sliding of the turret.

5. The composite processing machine according to claim 2, comprising:
a wedge mechanism provided with a wedge engagement part which moves or widens due to the back-sliding of the turret when the turret axially slides back and the clutch device is locked and secured, and
a wedge part which engages with the wedge engagement part,
wherein the wedge mechanism is configured so that the wedge part is moved to engage with the wedge engagement part by being driven or urged by a wedge drive device, thereby keeping the turret wedged and locked in a processing position where the turret has slid back to be locked and secured by the clutch device and made incapable of swiveling.

6. The composite processing machine according to claim 3, comprising:
a wedge mechanism provided with a wedge engagement part which moves or widens due to the back-sliding of the turret when the turret axially slides back and the clutch device is locked and secured, and
a wedge part which engages with the wedge engagement part,
wherein the wedge mechanism is configured so that the wedge part is moved to engage with the wedge engagement part by being driven or urged by a wedge drive device, thereby keeping the turret wedged and locked in a processing position where the turret has slid back to be locked and secured by the clutch device and made incapable of swiveling.

7. The composite processing machine according to claim 4, comprising:
a wedge mechanism provided with a wedge engagement part which moves or widens due to the back-sliding of the turret when the turret axially slides back and the clutch device is locked and secured, and
a wedge part which engages with the wedge engagement part,
wherein the wedge mechanism is configured so that the wedge part is moved to engage with the wedge engagement part by being driven or urged by a wedge drive device, thereby keeping the turret wedged and locked in a processing position where the turret has slid back to be locked and secured by the clutch device and made incapable of swiveling.

8. The composite processing machine according to claim 1, comprising:
a wedge mechanism provided with a wedge engagement part which moves or widens due to the back-sliding of the turret when the turret axially slides back and the clutch device is locked and secured, and
a wedge part which engages with the wedge engagement part,
wherein the wedge mechanism is configured so that the wedge part is moved to engage with the wedge engagement part by being driven or urged by a wedge drive device, thereby keeping the turret wedged and locked in a processing position where the turret has slid back to be locked and secured by the clutch device and made incapable of swiveling.

* * * * *